United States Patent [19]

Litz

[11] Patent Number: 4,814,149

[45] Date of Patent: Mar. 21, 1989

[54] PROCESS FOR RECOVERING MOLYBDENUM FROM SOLUTION IN A FORM THAT IS SUBSTANTIALLY FREE FROM VANADIUM

[75] Inventor: John E. Litz, Lakewood, Colo.

[73] Assignee: Chevron Research Company, San Francisco, Calif.

[21] Appl. No.: 915,306

[22] Filed: Oct. 3, 1986

[51] Int. Cl.$^4$ .................. C01G 39/00; C01G 39/02
[52] U.S. Cl. .................................... 423/56; 423/55
[58] Field of Search .................................... 423/55, 56

[56] References Cited

U.S. PATENT DOCUMENTS 4,500,495  2/1985  Hubred et al. .................. 423/55 X

FOREIGN PATENT DOCUMENTS 52895  4/1977  Japan .................................... 423/55

149134  11/1980  Japan .................................... 423/55

OTHER PUBLICATIONS

Mellor, *A Comprehensive Treatise on Inorganic and Theoretical Chemistry*, vol. XI, p. 595, (1948), pub. by Longmans, Green & Co., N.Y., N.Y.

Primary Examiner—Patrick P. Garvin
Attorney, Agent, or Firm—S. R. La Paglia; T. G. De Jonghe; P. L. McGarrigle

[57] ABSTRACT

The present invention is a process for selectively precipitating molybdenum in a form that is substantially free from vanadium impurities. The molybdenum is precipitated in the form of ammonium octamolybdate which has a molybdenum to vanadium ratio of about 400:1 in an initial crystallization and a ratio of about 1300:1 in a subsequent recrystallization.

9 Claims, 1 Drawing Sheet

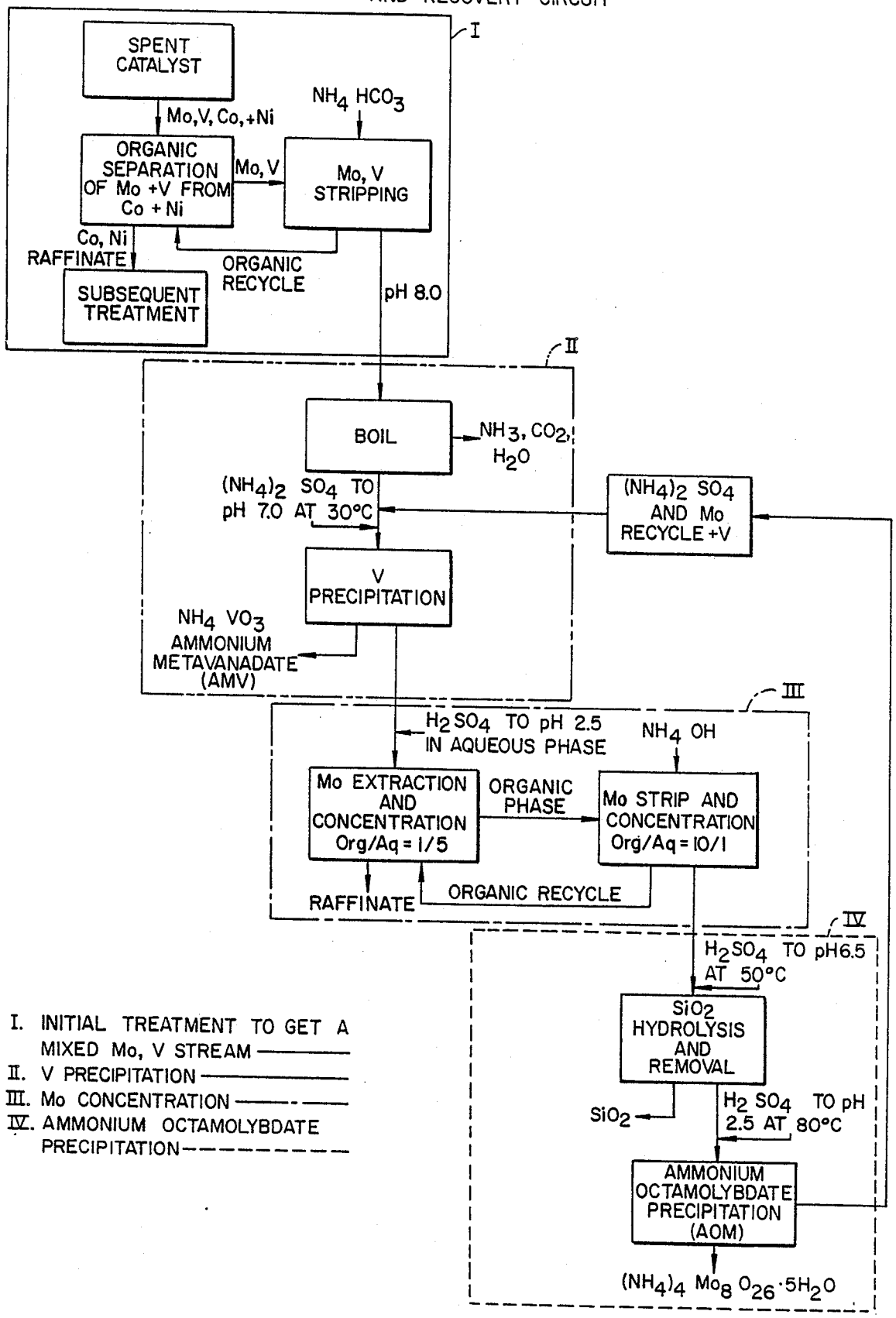
FIG._1.

PROCESS FOR RECOVERING MOLYBDENUM FROM SOLUTION IN A FORM THAT IS SUBSTANTIALLY FREE FROM VANADIUM

BACKGROUND OF THE INVENTION

The present invention relates to the recovery of molybdenum from solution. Here, the more specific use of the process is to recover molybdenum as ammonium octamolybdate in a form that is substantially free from vanadium.

Many hydrocarbon feedstocks contain high percentages of metals as contaminants, e.g., iron, nickel, or vanadium. Because of the growing shortages of petroleum in the world refiners are forced to use feedstocks that contain larger amounts of these metals. Once they are in the feed, they tend to deposit on the surfaces of and/or in the interstices between hydroprocessing catalysts which contain catalytic metals (e.g., cobalt, nickel, molybdenum, or tungsten). When the hydroprocessing catalysts no longer give the desired conversion rates (due to plugging of the catalyst pores by coke or the contaminant metals or due to reactor plugging), they are replaced and subsequently disposed of (and are called "spent catalysts"). Because of environmental and economic considerations, it is therefore desirable to recover the heavy metal values from the spent catalyst, leaving the catalyst support in an environmentally benign form.

The recovery of metals such as molybdenum and vanadium from spent catalysts is nothing new of course, as indicated by U.S. Pat. No. 4,500,495, issued Feb. 19, 1985 to Hubred et al; U.S. Pat. No. 4,554,138, issued Nov. 19, 1985 to Marcantonio; as well as U.S. Pat. Nos. 4,434,140 and 4,434,141, both issued Feb. 28, 1984 to Hubred et al, just to name a few which are totally incorporated by reference. However, these patents have never addressed the separation of molybdenum from vanadium into a substantially pure form.

The recovery of molybdenum from various sources has been described in the prior art [see U.S. Pat. No. 3,458,277, issued July 29, 1969 to Platzke et al and U.S. Pat. No. 3,957,946, issued May 18, 1978 to Ronzio et al; and J. Litz, "Solvent Extraction of W, Mo, and V: Similarities and Contrasts", *Extractive Metallurgy of Refractory Metals*, 69–81 (1980)]. See also, U.S. Pat. No. 3,455,677, issued Aug. 1, 1972 and U.S. Pat. No. 3,681,016, issued July 15, 1969 to John E. Litz. U.S. Pat. No. 3,455,677 involves evaporative crystallization of and precipitation molybdenum in a process to recover copper and molybdenum from ore concentrates. This patent describes two methods of forming a molybdenum compound. The first is by evaporative crystallization to force molybdenum out of solution at its solubility limit and the second is a high temperature polymerization which causes molybdenum precipitation. U.S. Pat. No. 3,681,016 involves the separation and recovery of molybdenum and rhenium values from solution.

Recovery of vanadium has also been described in the prior art. See U.S. Pat. No. 4,544,533, issued Oct. 1, 1985 and U.S. Pat. No. 4,551,315, issued Nov. 5, 1985 to P. J. Marcantonio, and U.S. Pat. No. 4,432,949 to G. L. Hubred et al. The patents to Marcantonio involve the recovery of vanadium from an aqueous ammonium bicarbonate strip solution and a subsequent precipitation. They are incorporated by reference. The patent to Hubred et al precipitates vanadium then removes nickel, cobalt, and molybdenum by serial ion exchange.

However, the prior art has not addressed or adequately solved the problem of vanadium contamination of molybdenum when evaporative crystallization or a chemical precipitation method is used.

It is an object of this invention to chemically precipitate molybdenum from a mixed solution of molybdenum and vanadium. It is a further object of this invention to precipitate molybdenum while rejecting at least 80% of the associated vanadium.

SUMMARY OF THE INVENTION

The present invention is a process capable of selectively recovering a substantially pure molybdenum precipitate from a solution that has molybdenum and vanadium values by precipitating molybdenum as ammonium octamolybdate. All the steps of the process comprise: crystallizing most of the vanadium from the initial solution; concentrating the molybdenum that remains in solution; removing the impurities from the concentrated solution; then precipitating the molybdenum, that is in solution, as ammonium octamolybdate. This last step selectively precipitates molybdenum and rejects 80% of the vanadium that has not been removed in the vanadium crystallization. Any vanadium or molybdenum that remains in solution may be recycled back to the process for further recovery.

Generally, the present invention is a process capable of selectively recovering a substantially pure molybdenum precipitate from a mixed solution comprising molybdenum and vanadium, by crystallizing vanadium as ammonium metavanadate and subsequently precipitating molybdenum as ammonium octamolybdate so that said precipitated molybdenum is substantially free from vanadium.

A more specific embodiment of the present invention involves the process steps of:
(a) crystallizing vanadium from a solution having a mixture of vanadium and molybdenum;
(b) extracting molybdenum from the remaining solution of molybdenum with an organic amine;
(c) stripping said extracted molybdenum with aqueous ammonia;
(d) heating said aqueous solution to boiling;
(e) adjusting the pH of said heated solution to between 5.5 and 8.5 to precipitate impurities; and
(f) adjusting the pH of said heated solution to between 1.5 and 3.0 to precipitate molybdenum;
whereby the molybdenum precipitate is substantially free of vanadium.

BRIEF DESCRIPTION OF THE DRAWING

FIG. 1 is a flow chart of the process of the present invention. Here, the process for recovering molybdenum (Mo) and vanadium (V) from spent catalysts is divided up into five sections: the initial treatment; the vanadium crystallization; the molybdenum concentration; and the molybdenum precipitation. In the initial treatment the spent catalyst is leached free of Mo, V, and other metals and then the Mo and V are extracted. The next section substantially removes all the V that is present in the mixed Mo/V stream. The next step concentrates the Mo in solution by organic and aqueous extraction. And, the final section precipitates the Mo as ammonium octamolybdate (AOM).

DETAILED DESCRIPTION OF THE INVENTION

The present invention selectively recovers molybdenum (Mo) from a mixed molybdenum/vanadium stream. A mixed molybdenum/vanadium stream may be obtained from many sources such as ore and spent catalysts. However, this invention discusses the recovery of molybdenum from spent catalysts.

To recover spent catalyst values, the spent catalyst may be first roasted and then leached with a solution of ammonia (ammonium hydroxide) and ammonium carbonate. This removes cobalt, molybdenum, vanadium, and nickel. Subsequently, molybdenum (Mo) and vanadium (V) are separated from cobalt and nickel by an organic solvent extraction step. Thereafter, ammonium bicarbonate ($NH_4HCO_3$) is used to strip the Mo and V from the solvent. For a more detailed explanation of these steps, see the patents to Hubred and Marcantonio which are hereby incorporated by reference.

Vanadium is crystallizated from a solution comprising molybdenum and vanadium. It is very important to crystallize as much vanadium as possible before trying to precipitate the molybdenum. This can be done as follows. First, the solution is boiled to decompose ammonium bicarbonate and expel $CO_2$, $NH_3$, and some $H_2O$. Then ammonium sulfate, $(NH_4)_2SO_4$, is added to the stripped solution and the pH is adjusted to between 7.0–7.5 and then cooled to 30° C. (This heating increases V precipitation by destroying any vanadium/carbonate complexes). This should crystallize the majority of vanadium as ammonium metavanadate (AMV), but approximately 30–40 ppm of V may be left in solution. For a more detailed explanation, see the patents to Marcantonio which are incorporated by reference.

At this point the solution may contain approximately 3–4 grams per liter (g/l) of Mo so that it must be concentrated prior to precipitation. Thus, the Mo in the vanadium-free solution is concentrated by an aqueous and organic extraction. The pH is adjusted between 2.0 and 4.0 or more preferably to 2.5 with $H_2SO_4$ (or another mineral acid which will not form complexes with either vanadium or molybdenum, i.e., HCl or $HNO_3$) and the solution is organic extracted with a combination of organic solvents, one of which is a tertiary amine (primary and secondary amines may work, but not as well). The solvent may include most of the commercial tertiary amines, such as tricapryl (Alamine 336 [trademark of General Mills, now owned by Henkel] or Adogen 364 [trademark of Sherex Chemical]. The diluent may be a kerosene (Kermac 470B [trademark of Kerr McGee], Standard Odorless Thinner, Escaid [trademark of Exxon] or something similar) or it can be an aromatic, such as "butylated" xylene (Solvent 150). If an aromatic diluent is used, there is no need to use an alcohol modifier. Modifiers other than isodecanol may be decanol, trimethyl nonanol, and similar alcohols. The actual combination of organic solvents may be: 10% Adogen 383; 10% isodecanol; and 80% Kermac 470B. The volume of this organic phase is approximately 1 part per 5 parts of original aqueous phase so that the Mo may be concentrated. The organic phase is then separated from the aqueous phase and contacted with an aqueous strip solution such as $NH_4OH$ (this forms an ammonium molybdate strip concentrate solution). The volume of ammonium hydroxide is 1 part per 10 parts of organic phase. Both the extraction and stripping steps are non-selective for either V or Mo, so their concentrations in this aqueous solution (having a pH of around 9.0) are approximately 1.5–2.0 g/l V and 150–200 g/l Mo. Because there are some impurities left in solution (such as the vanadium and silica) the Mo must be removed in a fourth and final step.

Impurities are then taken out by the following procedure. The concentrated solution (of the previous step) is heated to between 40° C. and 80° C., more preferably 50° C., and the pH is adjusted to between 5.5 and 9.0, but more preferably 6.5–8.5 using sulfuric acid (other mineral acids, i.e., HCl, $HNO_3$ are also suitable). These adjustments are made primarily to hydrolyze silica which precipitates out of solution and the precipitate is removed by filtration.

The solution is then contacted with $H_2SO_4$ (preferably) to adjust the pH to between 1.5 and 3.5, more preferably 2.5. It is also heated to between 70° C. and 90° C., more preferably 80° C., to initiate Mo precipitation as ammonium octamolybdate (AOM), $(NH_4)_4Mo_8O_{26} \cdot 5H_2O$. The slurry is not cooled. If it is cooled, the amount of vanadium reporting to the molybdenum precipitate might increase due to its lower solubility. Also, the rate of polymerization, of the soluble molybdenum into the less soluble octamolybdate species, would slow. Vanadium rejection at this precipitation is approximately 80% (i.e., of all V present only 20% precipitates out with the AOM). The precipitate is then removed by filtration and may be subjected to a second recrystallization procedure to further remove V.

The filtrate is then recycled back to the V precipitation step to remove the soluble V and recycle the extra $(NH_4)_2SO_4$ that is formed from the strip ammonia that reacts with the sulfate. This occurs during the solvent extraction when sulfuric acid is used to adjust the pH. This filtrate solution from the AOM precipitation contains both ammonium vanadate and molybdate. After the AOM is crystallized, it is calcined. This decomposes the AOM into $MoO_3$ by driving off $H_2O$ and ammonia.

EXAMPLE

In this example, Mo was chemically crystallized as AOM. An ammoniacal-ammonium carbonate leach solution, containing nickel, cobalt, vanadium, and molybdenum values, was fed to a continuous quaternary ammonium compound solvent extraction step where the vanadium and molybdenum were extracted by an organic solvent. The solvent comprised 80% Kermac 470B (as diluent), 10% Aliquat 336 (trademark of General Mills, now owned by Henkel) (as an extractant), 10% isodecanol (as a modifier). The loaded solvent was stripped of the vanadium and molybdenum with an ammonium bicarbonate solution that approached saturation, i.e., approximately 2.5M. A composite of ammonium bicarbonate strip solutions was boiled to evolve the carbon dioxide, the pH of the solution was adjusted to 7.0 (with $H_2SO_4$, if necessary), ammonium sulfate was added, and the mixture was cooled under agitation to form a crop of ammonium metavandate crystals. A composite of filtrates from the crystallization was adjusted to a pH of 2.5 with sulfuric acid and served as feed to a continuous tertiary amine solvent extraction where the molybdenum and residual vanadium were extracted by the solvent. The solvent comprised 10% Adogen 383, 10% isodecanol and 80% Kermac 470B. The loaded solvent was then stripped of the molybdenum and vanadium with an ammonium hydroxide solution (120 g/l $NH_3$) to form an ammonium molybdate strip concentrate.

Thereafter, a composite of the ammonium molybdate strip concentrate was heated to 50° C., the pH was adjusted to 6.5 with sulfuric acid, and the solution was allowed to digest for 1 hour. The hydrolyzed impurities were removed by filtration. The purified filtrate was heated to 80° C., adjusted to 2.5 pH with sulfuric acid and seeded with ammonium octamolybdate (AOM). The resulting slurry was digested for 4 to 5 hours, filtered, and the chemically precipitated crystals were washed with a pH 2.5 sulfuric acid solution. The crystallization above showed 80% of the initial vanadium to be separated from the molybdenum product.

The filtrates from the AOM crystallization were recycled to the ammonium metavanadate (AMV) crystallization as a source of ammonium sulfate and for the purpose of recycling the contained vanadium and molybdenum. The molybdenum concentrations in the filtrates are in the range from 1.9 to 4.7 grams per liter. Table I shows the relative concentrations of the metals that have been precipitated.

TABLE I

|  | Feed Mo/V | AOM Precipitate, Mo/V | |
| --- | --- | --- | --- |
|  |  | Initial | Recrystallization |
| Batch 1 | 106:1 | 463:1 | ~1300:1* |
| Batch 2 | 58:1 | 333:1 | |

*The initial precipitates from Batches 1 and 2 were consolidated and recrystallized.

Calcium impurities may be avoided by using demineralized water for the molybdenum solvent extraction strip solution. Additionally, silicon does not re-solubilize if the crystals are dissolved for recrystallization. Once silicon precipitates, it stays as a precipitate. Also, nickel cannot be separated from Mo if it goes through the first separation.

The vanadium content of the molybdenum product can best be controlled by attaining low vanadium levels in the ammonium metavanadate mother liquor. If this crystallization is operated ideally, less than 50 milligrams per liter vanadium in the mother liquor, the feed to the molybdenum recovery will have a molybdenum/vanadium ratio greater than 200.

Since many modifications and variations of the present invention are possible within the spirit of this disclosure, it is intended that the embodiments disclosed are only illustrative and not restrictive. For that reason, reference is made to the following claims rather than to the specific description to indicate the scope of this invention.

What is claimed is:

1. A process for recovering molybdenum in a purified form substantially free from vanadium impurities, said process comprises:
    (a) crystallizing vanadium from a solution having a mixture of vanadium and molybdenum;
    (b) extracting molybdenum from the remaining solution of molybdenum with an organic solvent;
    (c) stripping said extracted molybdenum with an aqueous solvent;
    (d) heating said aqueous solution from step (c) to between 40° C. and 80° C.;
    (e) adjusting the pH of said heated solution to between 5.5 and 8.5 to precipitate impurities; and
    (f) adjusting the pH of said heated solution to between 1.5 and 3.0 to precipitate molybdenum as ammonium octamolybdate;
whereby the molybdenum precipitate is substantially free of vanadium.

2. A process for selectivity recovering a substantially pure molybdenum precipitate from a solution used to extract molybdenum from spent catalysts comprising the following steps:
    (a) separating molybdenum and vanadium from other metal values with an organic solvent;
    (b) stripping molybdenum and vanadium from said organic solvent with an aqueous solvent;
    (c) heating said aqueous solution containing the molybdenum and vanadium to boiling;
    (d) cooling said boiled solution and adjusting the pH to between 7.0 and 7.5 to crystallize a majority of the vanadium that is in said solution;
    (e) adjusting the pH of the remaining solution to between 2.0 and 4.0;
    (f) solvent extracting said molybdenum from the solution of step (b) to increase the molybdenum concentration;
    (g) stripping the organic solution having the molybdenum with an aqueous strip solution to further increase the molybdenum concentration;
    (h) adjusting the pH of the aqueous molybdenum solution to between 6.5 and 9.0 with sulfuric acid to hydrolyze impurities;
    (i) adjusting the pH of the remaining solution to between 1.5 and 3.5 to precipitate the molybdenum as ammonium octamolybdate; and
    (j) recycling the remaining solution to a point immediately upstream of the vanadium precipitation in step (e).

3. The process as recited in claim 1 or 2 in which the ammonium octamolybdate precipitate is washed with demineralized water.

4. The process of claim 1 or 2 where the ammonium octamolybdate precipitate is redissolved in pure water and the process is repeated.

5. The process of claim 1 or 2 where the ammonium octamolybdate precipitate is calcined to convert the ammonium octamolybdate to molybdenum trioxide.

6. A process for selectively recovering a substantially pure molybdenum precipitate from a solution comprising molybdenum and vanadium values, the process comprises:
    (a) crystallizing vanadium from said solution to form a substantially vanadium-free mother liquor;
    (b) concentrating molybdenum in said vanadium-free mother liquor to form a molybdenum-rich concentrate;
    (c) removing impurities from said molybdenum-rich concentrate by adjusting the pH of said concentrate to between 5.0 and 9.0; heating said concentrate to between 20° C. and 70° C.; allowing said concentrate to digest for between 0.5 and 2 hours; and filtering out said impurities; and
    (d) precipitating molybdenum as ammonium octamolybdate from said concentrate to recover a substantially vanadium-free molybdenum value.

7. A process a recited in claim 6 wherein the molybdenum is concentrated according to step (b) by first extracting an aqueous molybdenum solution with an organic solvent of lesser volume and then extracting the molybdenum with an aqueous solvent of lesser volume than said organic solvent.

8. A process as recited in claim 6, step (d) wherein the molybdenum is precipitated as ammonium octamolybdate by adjusting the pH of the solution of step (c) to between 2.0 and 5.0 with sulfuric acid; heating the solution to between 50° C. and 95° C.; allowing the solution to digest for between 3 and 6 hours; seeding the solution; removing the precipitated ammonium octamolybdate; and recycling the remaining solution to the vanadium crystallization step.

9. A process for selectively recovering a substantially pure molybdenum precipitate from a solution comprising a mixture of molybdenum and vanadium values, said process comprising crystallizing a majority of the vanadium values from said solution as a precipitate of ammonium metavanadate, concentrating the filtrate of said solution to assist removal of impurities in the resulting concentrate by filtration, and then concentrating the concentrated solution of molybdenum and residual vanadium values with an acid to precipitate ammonium octamolybdate therefrom while rejecting greater than 80% of said vanadium values into the extract from such precipitation of said ammonium octamolybdate.

* * * * *